April 5, 1932.　　　C. R. KITTLE　　　1,852,616
SAW
Filed June 2, 1931
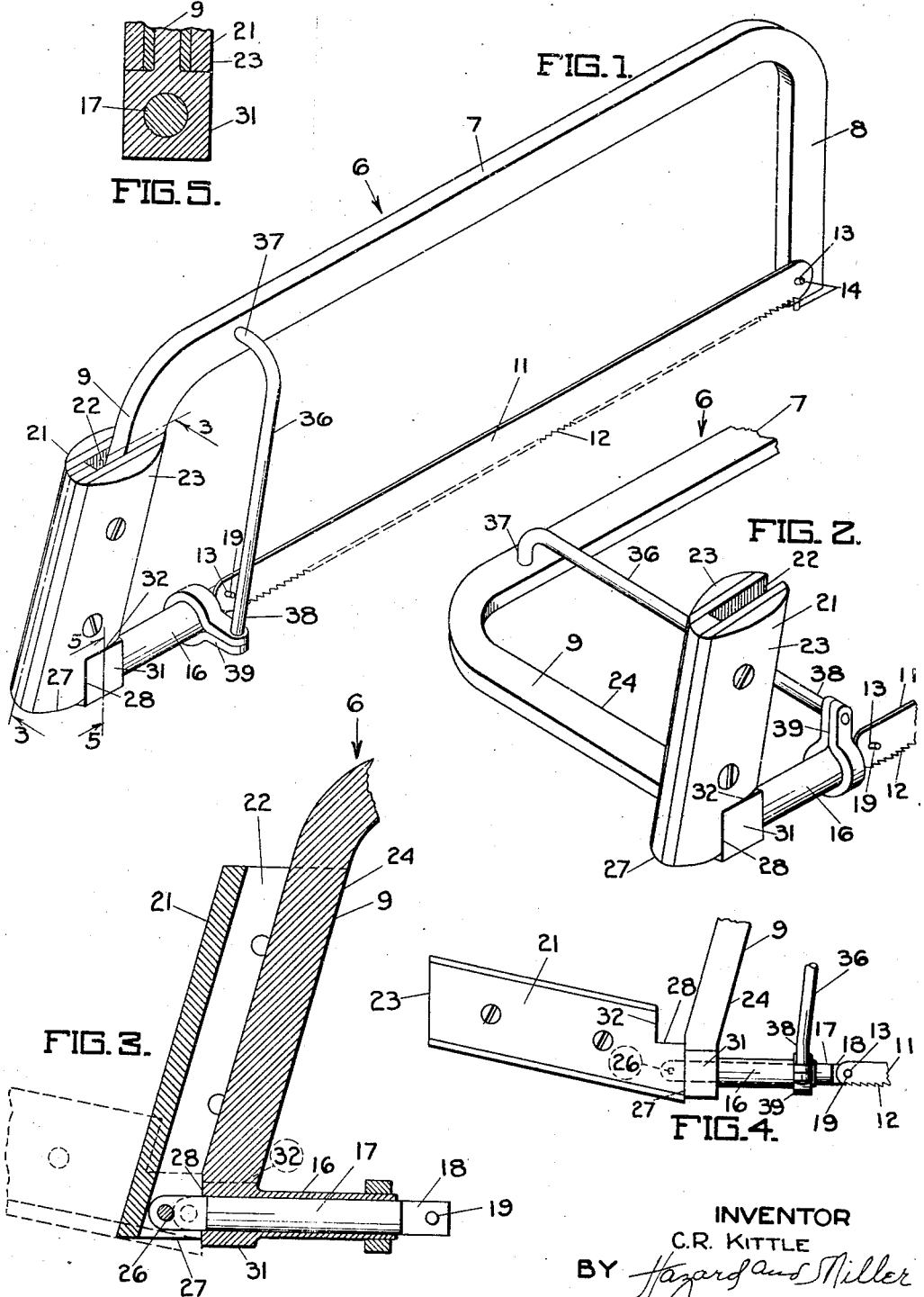
INVENTOR
C. R. KITTLE
BY Hazard and Miller
ATTORNEYS Patented Apr. 5, 1932

1,852,616

UNITED STATES PATENT OFFICE

CHARLES R. KITTLE, OF ELSINORE, CALIFORNIA

SAW

Application filed June 2, 1931. Serial No. 541,624.

This invention relates to metal and woodworking tools, and more especially to saws of the type employing a saw blade tensioned in a suitable frame, this type of saw being commonly known in the trade as a "hack saw."

An object of the invention is the provision of a saw of the general type described, having improved means for imposing tension upon the blade, this tensioning means being of such design that it may be operated with extreme ease and within an absolute minimum of time, either to impose or relieve the tension upon the blade, with the result that the step of replacing the saw blade in the frame is materially facilitated.

Another object is to provide a saw of the general character described, wherein the blade may be mounted either within the plane of the frame or in a plane extending angularly with respect thereto.

A further object is to provide a guard on the saw frame adapted to protect the hand of the operator from injury by striking the material being cut.

The invention possesses other objects and advantageous features, some of which, with those enumerated, will be set forth in the following description of the invention's particular embodiment which is illustrated in the drawings accompanying and forming a part of the specification.

Referring to the drawings:

Fig. 1 is a perspective view illustrating a saw embodying the principles of the present invention.

Fig. 2 is a view similar to Fig. 1, showing the saw blade and handle swung to a different position. A portion of the figure is broken away to reduce its size.

Fig. 3 is an enlarged longitudinal vertical sectional view, the plane of section being indicated by the line 3—3 of Fig. 1, and the direction of view by the arrows. This view shows the tensioning device in operative position, and a portion of the figure is broken away to reduce its size.

Fig. 4 is a view similar to Fig. 3, but showing the tensioning device swung to released position.

Fig. 5 is an enlarged transverse sectional view taken upon the line 5—5 of Fig. 1, with the direction of view as indicated.

Specifically describing my improved saw in one of its preferred embodiments, the device of the present invention comprises a frame 6 made up of a back 7 and legs 8 and 9 extending therefrom preferably at the ends of the back 7. These legs 8 and 9 extend to the same side of the back 7, so that a saw blade 11 may be tensioned between their outer ends. The frame 6 preferably is of metal, and is of such cross sectional area that the back 7 may be bowed slightly by that amount of pressure exerted against the outer ends of the legs 8 and 9 which may be exerted by a person, with the result that the legs 8 and 9 may be bent toward each other in order to mount the saw blade 11 thereupon, and after the pressure against the legs 8 and 9 is released, the inherent resilience of the frame 6 will impose some degree of tension upon the blade 11.

Whereas any type of blade 11 may be employed in conjunction with the back 7, the saw of the present invention has been designed especially for use in conjunction with the conventional hack saw blade, which is of relatively thin, hardened steel, and which is provided with relatively fine teeth 12 intended to cut metal. Such a blade 11 is customarily provided with a hole 13 adjacent each end. Hence, one end of the blade 11 may conveniently be attached to the forward leg 8 of the back 7 by inserting either of a plurality, preferably two, pins 14 through one of the holes 13. One of the pins 14 extends laterally from a side face of the leg 8, whereas the other pin 14 extends downwards from the extreme end of the leg 8. Hence, when the pin 14 extending laterally is employed the blade 11 will be mounted substantially within the plane of the frame 6, whereas when the other pin 14, i. e., the one which extends from the end of the leg, is employed, the blade 11 will lie in a plane extending angularly with respect to the plane of the frame 6. This is the position in which the blade should be mounted when a cut is to be made deeper than the distance between the blade 11 and the back 7, provided the cut is to be made in the work at a distance from an end of the work which is less than the distance between the blade 11 and the back 7.

Adjustable means are provided on the other leg 9 for engaging the other end of the blade 11 and for imposing the necessary degree of tension thereupon, so as to hold the blade taut so that it can be pressed against the work without unduly bending the blade. This tensioning means comprises a tube 16 rigid with the lower end of the leg 9 and extending therefrom toward the leg 8. Within the tube 16 a rod 17 is mounted for sliding and rotary movement. The rod 17 extends beyond the inner or forward end of the tube 16 toward the leg 8, and is provided with a flat portion or face 18 having a pin 19 extending laterally therefrom. This pin is adapted to seat within the hole 13 at the other end of the blade 11, so that when the rod 17 is pulled away from the leg 8, tension will be imposed upon the blade.

A handle 21 is pivotally mounted upon the after end of the rod 17. This handle is provided with a longitudinally extending groove 22, within which the leg 9 is adapted to be received when the handle 21 is swung upwards thereupon. Preferably, the parts are so proportioned and arranged that when the leg 9 is disposed within the groove 22, the sides 23 of the handle extend to the forward edge 24 of the leg 9, with the result that the edge 24 presents a smooth surface along the forward edge of the handle 21, thereby providing a comfortable grip for the operator's hand.

The pin 26 whereby the rod 17 is pivotally connected to the handle 21 engages the handle 21 adjacent the lower end 27 thereof. In fact, the distance between the axis of the pin 26 and the end 27 is less than the distance between the axis of the pin 26 and a shoulder 28 which is formed on the handle, extending substantially perpendicularly with respect to the end 27 and spaced forward from the pin 26. Hence, when the handle 26 is turned to the position indicated upon Fig. 4, wherein the end 27 thereof is disposed against the after end of the tube 16, the rod 17 is permitted to slide forward to relieve the tension imposed upon the saw blade 11; and when the handle 21 is swung into position of angularity with respect to the longitudinal axis of the blade 11, as indicated upon either of Figs. 1 or 2, wherein the shoulder 28 engages the after end of the tube 16, the rod 17 will be pulled away from the leg 8, thereby increasing the tension upon the blade 11.

As stated hereinabove, the rod 17 is rotatable within the tube 16, as well as slidable longitudinally. Hence, swinging movement of the handle 21 about the axis of the pin 26 may take place either in the plane of the frame 6 or in a plane extending angularly with respect thereto. Accordingly, when the forward end of the blade 11 is mounted upon the pin 14 which extends from the extreme end of the leg 8, the rod 17 and handle 21 should be swung through 90° about the axis of the rod 17, so that when the handle 21 is swung about the axis of the pin 26, it will swing upwards out of the plane of the frame 6 and into substantially the position illustrated upon Fig. 2. When so positioned, the leg 9 and handle 21 will be disposed substantially at right angles with each other.

Means are provided for holding the handle 21 rigidly against swinging to either side from the position illustrated upon Fig. 2, thereby retaining the face 18 of the rod 17 accurately in parallelism with the face at the end of the leg 8 from which the associated pin 14 extends, and preventing any possibility of twisting the saw blade 11. This means is in the form of a square portion 31 formed at the after end of the tube 16, against the outer end of which the shoulder 28 is adapted to engage when the handle 21 is in tensioning position, and against one of the side faces of which the surface 32 of the handle 21 which extends forward from the shoulder 28 is adapted to engage, as clearly shown upon Fig. 2. Hence, the surface 32 engages one of the side faces of the square portion 31 when the blade 11 is tensioned in a plane perpendicular to that of the saw frame 6, and the surface 32 engages the upper face of the square portion 31 upon both sides of the leg 9 when the saw is tensioned within the plane of the frame 6.

A guard 36 is provided to protect the hand of the operator against being injured by coming into engagement with the work. This is particularly apt to happen when the cut through the work is completed, owing to the fact that considerable pressure must be exerted by the blade 11 against the work. Hence, when the cut is completed and the resistance to the motion of the teeth 12 of the blade 11 against the work is suddenly removed, it is probable that the operator will lurch forward, causing the hand which engages the handle 21 to strike the corner of the work. Accordingly, the guard 36 is positioned slightly forward of the handle 21, and preferably is in the form of a rod secured at its upper end 37 to the back 7 and at its lower end 38 to a bracket 39 which extends laterally from the forward end of the tube 16. Thus it may be seen that the guard 36 is disposed in a position slightly offset from the plane of the frame 6, and in such position that it, instead of the operator's hand, will come into engagement with the end of the work in the event that the operator lurches forward upon completion of the cut, as hereinabove described.

When it is desired to mount a blade 11 in the frame 6, the handle 21 should be swung to the position illustrated upon Fig. 4, wherein the handle extends substantially in the line of the blade 11 and perpendicularly from the lower end of the blade 9. The operator then should engage one of the pins 14 of the forward leg 8 within the hole 13 at one end of the blade 11, and then by exerting pressure against both legs 8 and 9, draw the leg 9 toward the leg 8 far enough to permit insertion of the pin 19 through the other hole 13 of the blade 11. Then, by swinging the handle 21 about the axis of the pin 26, the shoulder 28 may be brought into engagement with the outer face of the square portion 31 imposing sufficient additional tension upon the blade 11 to prevent its being unduly bent even when considerable pressure is exerted by the blade against the work.

As explained hereinabove, for normal use of the saw the blade 11 should be engaged upon that pin 14 which extends laterally from the leg 8, and the rod 17 so turned that when the handle 21 is swung to operative position the leg 9 will lie within the groove 22 of the handle. However, if the cut to be made is deeper than the distance between the blade 11 and the pin 7, and provided the cut is closer to an end of the work than this distance, the other pin 14 may be employed, under which circumstances the handle 21 and rod 17 should be swung through 90° about the axis of the rod 17, positioning the face 18 of the rod 17 parallel to the face at the end of the leg 8 before the blade 11 is engaged with the pins 14 and 19. Hence, after the blade has been engaged with the pins and the handle swung so as to impose the desired tension upon the blade, the handle will extend perpendicularly with respect to the plane of the frame 6 and parallel to the blade 11, with the result that the stroke of the operator is substantially the same as though the blade were mounted in the normal manner, although the frame 7 extends laterally instead of vertically from the blade.

It is to be understood that the details of the invention as herein disclosed, are subject to alteration within the spirit or scope of the appended claims.

I claim:

1. In a saw, a frame comprising a back and a pair of spaced legs carried thereby, a blade stretched between said legs, a handle connected to one of said legs, and a guard comprising a rod rigid with and extending laterally from said back, said rod being bent adjacent and substantially into parallelism with said handle but offset laterally and spaced forwards therefrom, and means anchoring the other end of said rod to said frame.

2. In a saw, a frame comprising a back and a pair of spaced legs extending therefrom, a saw blade, means for connecting one end of said blade to one of said legs with said blade disposed optionally in the plane of said frame or in a plane extending angularly with respect thereto, and adjustable means carried by the other of said legs for imposing tension upon said blade, said other leg having a socket therein and said tensioning means comprising a rod slidable within said socket, means on said rod for engaging the other end of said blade, said rod being receivable within said socket when turned with respect thereto to either of two positions to position said engaging means in operative relation to said blade with said blade lying in either of said planes, and a handle pivoted to said rod and having a shoulder engageable with the associated leg to draw said rod away from the other leg when said handle is swung about its axis of pivotal mounting.

3. In a saw, a frame comprising a back and a pair of spaced legs extending therefrom, a saw blade, means for connecting one end of said blade to one of said legs with said blade disposed optionally in the plane of said frame or in a plane extending angularly with respect thereto, and adjustable means carried by the other of said legs for imposing tension upon said blade, said tensioning means comprising a slidably mounted rod engageable with the other end of said blade with said blade lying in either of said planes, said rod being rotatable to permit its engagement with said other end with said blade lying in either of said planes, and a handle pivoted to said rod and having a shoulder engageable with the associated leg to draw said rod away from the other leg when said handle is swung to a position of angularity with said blade.

4. In a saw, a frame comprising a back and a pair of spaced legs extending therefrom, a saw blade, means for connecting one end of said blade to one of said legs with said blade disposed optionally in the plane of said frame or in a plane extending angularly with respect thereto, and adjustable means carried by the other of said legs for imposing tension upon said blade, said tensioning means comprising a slidably mounted rod engageable with the other end of said blade with said blade lying in either of said planes, said rod being rotatable to permit its engagement with said other end with said blade lying in either of said planes, a handle pivoted to said rod and having a shoulder engageable with the associated leg to draw said rod away from the other leg when said handle is swung to a position of angularity with said blade, and means for holding said rod against rotary movement when said handle is swung to said position of angularity.

5. In a saw, a frame comprising a back and a pair of spaced legs extending therefrom, a saw blade, means for connecting one end of said blade to one of said legs with said blade disposed optionally in the plane of said frame or in a plane extending angularly with respect thereto, and adjustable means carried by the other of said legs for imposing tension upon said blade, said tensioning means comprising a slidably mounted rod engageable with the other end of said blade with said blade lying in either of said planes, said rod being rotatable to permit its engagement with said other end with said blade lying in either of said planes, a handle pivoted to said rod and having a shoulder engageable with the associated leg to draw said rod away from the other leg when said handle is swung to a position of angularity with said blade, means for holding said rod against rotary movement when said handle is swung to said position of angularity, and a guard extending from adjacent the forward end of said rod to the back of said frame.

6. In a saw, a frame comprising a back and a pair of spaced legs extending therefrom, a saw blade, means for connecting one end of said blade to one of said legs with said blade disposed optionally in the plane of said frame or in a plane extending angularly with respect thereto, and adjustable means carried by the other of said legs for imposing tension upon said blade, said tensioning means comprising a slidably mounted rod engageable with the other end of said blade with said blade lying in either of said planes, said rod being rotatable to permit its engagement with said other end with said blade lying in either of said planes, a handle pivoted to said rod and having a shoulder engageable with the associated leg to draw said rod away from the other leg when said handle is swung to a position of angularity with said blade, means for holding said rod against rotary movement when said handle is swung to said position of angularity, and a guard offset laterally from the plane of said handle and extending from adjacent the forward end of said rod to the back of said frame.

7. In a saw, a frame comprising a back and a pair of spaced legs extending therefrom, a saw blade, means for connecting one end of said blade to one of said legs, and adjustable means carried by the other of said legs for imposing tension upon said blade, said tensioning means comprising a slidably mounted rod engageable with the other end of said blade, and a handle pivoted to said rod and having a shoulder engageable with the associated leg to draw said rod away from the other leg when said handle is swung to a position of angularity with said blade, said handle having a longitudinally extending groove and the associated leg of said frame being receivable within said groove when said handle is swung to said position of angularity.

In testimony whereof I have signed my name to this specification.

CHARLES R. KITTLE.